Sept. 26, 1944.                J. G. WILLIAMS                2,359,180
                               DYNAMIC BALANCER
                           Filed Aug. 11, 1942            2 Sheets-Sheet 1

Inventor
John G. Williams
By Blackmore, Spencer & Flint
Attorneys

Sept. 26, 1944.     J. G. WILLIAMS     2,359,180
DYNAMIC BALANCER
Filed Aug. 11, 1942     2 Sheets-Sheet 2

Inventor
John G. Williams
By Blackmore, Spencer & Hunt
Attorneys

Patented Sept. 26, 1944

2,359,180

UNITED STATES PATENT OFFICE 2,359,180

DYNAMIC BALANCER

John G. Williams, Indianapolis, Ind., assignor to General Motors Corporation, Detroit, Mich., a corporation of Delaware Application August 11, 1942, Serial No. 454,439

4 Claims. (Cl. 74—574)

This invention has to do with dampers for eliminating torsional vibrations and particularly with dampers of the centrifugal pendulum type used on crankshafts of internal combustion engines. Such dampers act as pendulums, the restoring force being centrifugal force instead of gravity as in the case of the ordinary pendulum. They are characterized by the fact that the number of swings of the pendulum per revolution of the shaft is constant at all speeds of rotation.

It has also long been known that the number of swings of a centrifugal pendulum during each revolution of the shaft varies directly as the square root of the ratio between the distance from the center of the shaft to the fulcrum of the pendulum and the length of the pendulum. This relation is expressed mathematically by the formula $$n = \sqrt{\frac{R}{L}}$$

where $n$ = number of swings of the pendulum during each revolution of the shaft;
$R$ = the distance from the center of the shaft to the fulcrum of the pendulum, and
$L$ = the length of the pendulum—that is, the distance from the pivot of the pendulum to its center of gravity.

As an example of the operation of a centrifugal pendulum damper, if a crankshaft is provided with such a damper designed to make four complete swings during each revolution of the shaft, and the crankshaft is subjected to four twisting impulses during each revolution—as for example, by explosions in four different cylinders of the engine during each revolution—the four twists in the shaft produced by the explosions during each revolution are neutralized by the pendulum swinging four times each revolution in a direction to tend to twist the shaft in the opposite direction.

A special difficulty is encountered where the number of twisting impulses during each revolution is low for in that case the pendulum must be designed to swing but a few times per revolution. A centrifugal pendulum designed for a small number of swings per revolution must be comparatively long with respect to the distance from the center of the shaft to its fulcrum; that is, L, of the equation must be long with respect to R.

The improved centrifugal pendulum damper disclosed in this application is especially adapted to neutralize twisting impulses occurring a very few number of times per revolution, for example one and one-half times per revolution in the case of a particular twelve cylinder V engine. It consists essentially of a weight pivoted to the end of a link, the weight being provided with guiding means so that in swinging all points on the weight will move along arcs of the same length and radius. Were guiding means not provided the pendulum would be less effective in that it would not be performing a substantially pure pendulum movement. Furthermore there would be nothing to prevent the pendulum from striking the shaft at the ends of its swing, particularly at the low speeds and upon starting when the centrifugal force is low. The damper is, of course, designed so as to permit it to perform its pendular movement rather than stick and fail to swing and to accomplish this is preferably provided with anti-friction or other good bearings at its pivots and in its guiding means.

In the drawings:

Figure 3 is a section taken along the line of 3—3 of Figure 2.

Figure 4 is a section taken along the line of 4—4 of Figure 2.

Figure 1:
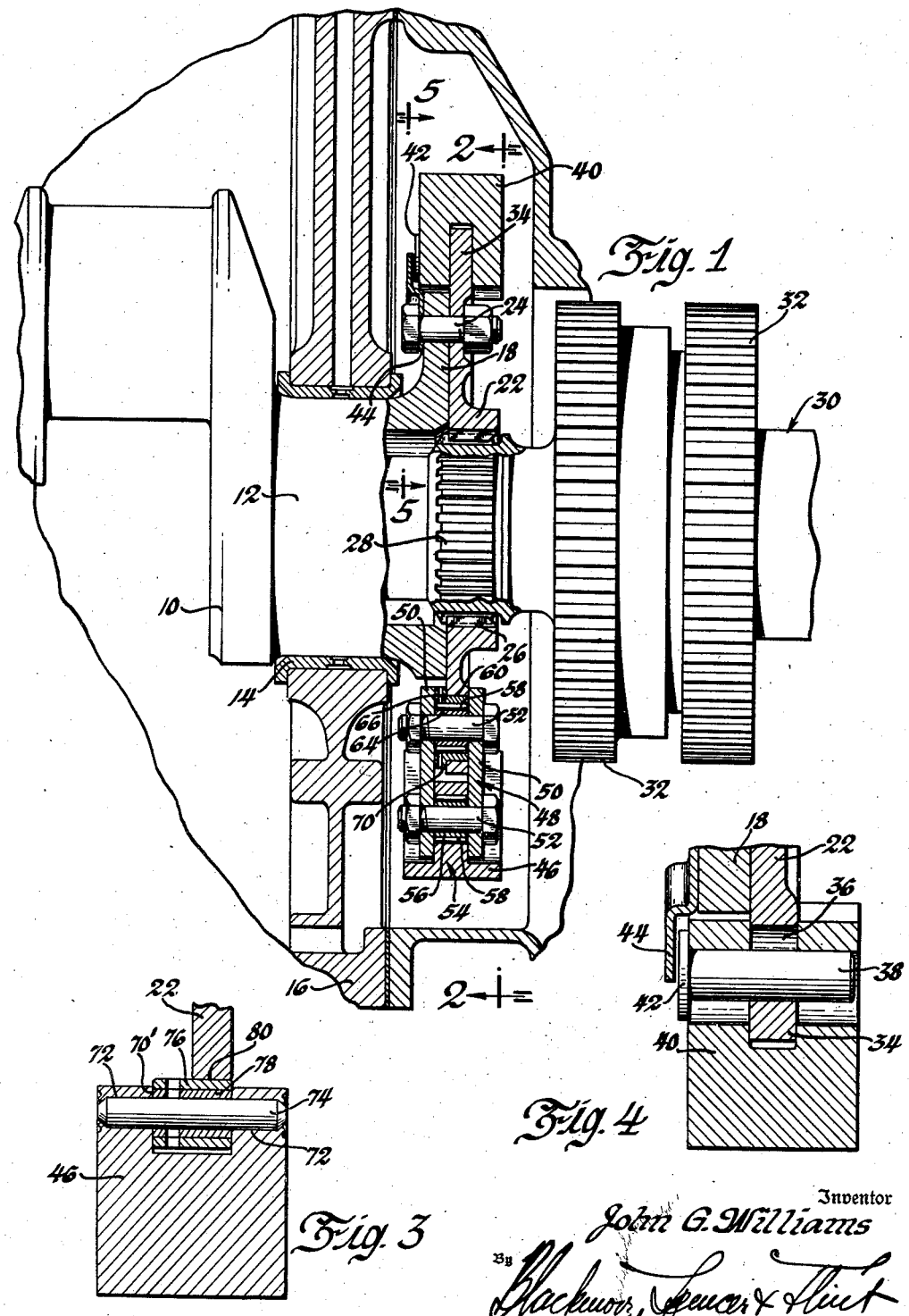
Figure 1 is a view partially in longitudinal section showing the application of the improved damper to one end of the crankshaft of an internal combustion engine. The view is taken substantially on line 1—1 of Figure 2.

In the specific embodiment of my invention shown in Figure 1, 10 indicates one end of the crankshaft of an internal combustion engine. 12 indicates one of the journals of the crankshaft carried in suitable bearings 14 mounted in web 16 of the crankcase in the usual manner. Journal 12 is preferably bored out to reduce its weight and is provided with an integral end flange 18 interrupted at three points 20 spaced 120° apart for a purpose later to be explained. To the end flange 18 is secured plate 22 by means of suitable bolts and nuts indicated at 24. Plate 22 is preferably provided with internal splines as indicated at 26 adapted to mesh with external splines 28 on a stub or extension shaft 30 which may be provided with gears as indicated at 32 for driving the engine auxiliaries, such as the generator, supercharger and the like.

Figure 5:
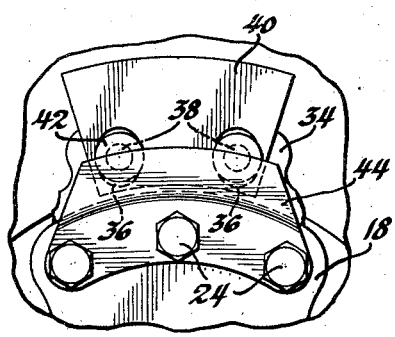
Figure 5 is a view on line 5—5 of Figure 1.

At points 120° apart the plate 22 is provided with radial extensions 34 apertured as indicated at 36 to receive pins 38 on which are hung pendulum dampers 40. The pins 38 are provided at one end with flanges 42 to limit their movement in one direction while movement in the other direction is prevented by stampings 44, one of which is shown in Figure 5, bolted or otherwise rigidly secured to the flange 18 on the end of the crankshaft. The type of pendulum damper just described is well known and its operation will be understood by those skilled in the art.

Between centrifugal pendulum dampers 40 are secured the improved dampers embodying my invention. These dampers consist essentially of a weight 46 suspended from the plate 22 by means of a swinging link assembly 48. In the specific embodiment shown the link assemblies consist of plates 50 apertured at their ends to receive bolts or pivot pins 52. The outer bolt 52 passes through an aperture provided in the pendulum 54 and is surrounded by an inner race or spacer 56. A series of needle bearing rollers 58 is provided between the sleeve 56 and the interior of the aperture in the damper weight. Passages 59 are provided to permit oil to reach these bearings.

The other bolt or pivot pin 52 passes through an aperture 60 formed in the plate 22. A needle bearing is likewise provided to receive this bolt, the bearing consisting of an inner race or spacer 64, and an outer race 66, together with needle bearing rollers 58 between the races. The outer bearing race 60 is preferably provided with a flange 70 at one end provided with an oil passage as shown to permit lubricant to reach the needle bearings. It is to provide clearance for the pivot just described that the flange 18 or the crankshaft is cut away at the points 20.

The opposite ends of the damper weight are slotted as indicated at 70' and the resulting flanges are apertured as indicated at 72 to receive spindle 74 on which is mounted roller 76 preferably provided with a suitable bushing 78. Roller and bushing are apertured as indicated to permit oil to reach the bearing surfaces.

The rollers 76 engage cam guide surfaces 80 formed on the plate 22. The curvature of the surfaces 80 is such that throughout its arc of swing all points on the damper weight move along arcs of the same length and radius. It has been determined that the radius of the cam guide surfaces should be equal to the length L of the pendulum minus the radius of the roller 76. The centers of the cam guide surfaces 80 are indicated at C. It will be noted that with the damper in mid position the lines connecting the centers C with the centers of the rollers 76 are parallel with the line passing through the centers of the crankshaft and the centers of the bolts or pivots 52.

Figure 2:
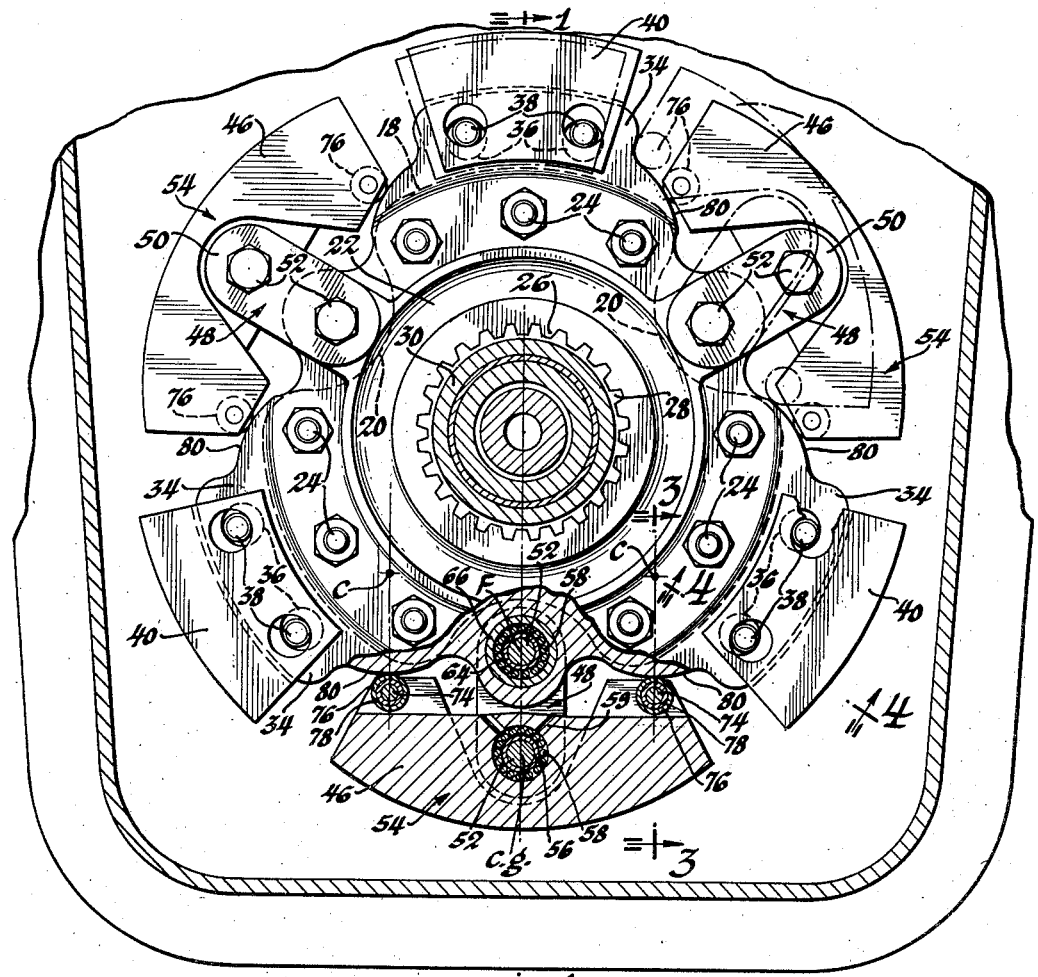
Figure 2 is a view taken on line 2—2 of Figure 1 with parts broken away.

The damper is preferably designed with the center of gravity of the damper weight 46 at the center of the outer pivot of the link assembly 48, this point being indicated by the letters c. g. on Figure 2.

During operation of the engine should the crankshaft be subjected to twisting impulses, recurring the same number of times per revolution as the natural rate of swing of the damper weight, the latter will be set oscillating and will swing back and forth on the link, assuming in extreme cases the position indicated by dotted lines at the upper right hand part of Figure 2. Actually at the operating speeds of the high-powered aviation engines with which this damper is used, the amplitude of swing will be much less than indicated. The swinging of the damper weight back and forth will lag behind the twisting of the shaft due to the torsional impulses to such an extent that when one of a series of impulses tuned to the same frequency per revolution as the damper tends to twist the shaft in one direction, the damper weight will react through the link and tend to twist it in the other direction thereby more or less neutralizing the effect of the impulse.

It will be noted that inasmuch as centrifugal force is tending to move the weight 46 outwardly there is but little pressure on the rollers 76. Consequently plain bearings are adequate although, if desired, needle bearings could be used.

A comparison of the damper indicated at 40 with my improved damper will make clear the value of the new construction with respect to damping vibrations occurring but a few times per revolution of the crankshaft. Thus in the case of my improved damper the pendulum length is the distance between the centers of the bolts or pivots 52. In the case of the damper indicated at 40 the pendulum length is equal to the distance between the diameter of the roller 38 and the diameter of the apertures in which it is received. It is obvious that if an effort were made to employ this construction for a pendulum of considerable length the result would be to very greatly increase the size of the apertures with resultant weakening of the construction.

While I have indicated provision for lubrication by oil thrown from the bearings and splashed about in the crankcase, provision may be made for force feed lubrication of the damper pivots and rollers if desired.

My improved damper has performed very satisfactorily in actual service in high powered aviation engines.

While I have shown the improved dampers arranged in the same plane and symmetrically disposed about the shaft axis so that they are dynamically and statically in balance, if desired but one may be used. In such event it should take the place of one of the usual counterweights so as not to disturb the balance of the shaft.

It will be understood, of course, that where a number of dampers is employed as in the form illustrated, the spacing of them about the shaft axis will depend upon the number of cylinders and the design of engine. Thus the 120° spacing will be employed in six cylinder in line engines with a conventional 120° crankshaft. In an eight cylinder in line engine with the usual type of crankshaft the spacing would be 90°, and so on.

In some instances it may be found desirable to replace the needle bearings 58 with plain bearings, preferably of material such as silver, with or without a thin lead coating, or copper-lead alloy, having not only good frictional properties but also relatively high compression strength to enable it to carry heavy loads. Where plain bearings are employed force feed lubrication may be used, if desired.

In designing my improved balancer, it will be found that good results may be obtained without taking into account in the computation the inertia of the links 50 as this factor appears to have a negligible effect on tuning where, as in this design, the mass of the links is relatively low compared to the mass of the swinging weights. If heavy links are used their weight is a factor in determining the value of L in the formula.

I claim:

1. In a torsional vibration damper the combination of a rotatable shaft having a link eccentrically pivoted thereto, a weight pivoted at its center of gravity to the opposite end of the link, and cooperating guiding means on the shaft and weight, said link being of such length that the pivots are spaced apart a distance greater than the sum of the radii of the pivot bearings, whereby swinging movement of all points on the weight is confined to arcs of the same length and radius, said guiding means including rotatable antifriction rollers engaging a track substantially free from the action of centrifugal force.

2. In a torsional vibration damper the combination of a rotatable shaft having a link eccentrically pivoted thereto on an axis substantially parallel with the shaft axis, a weight pivoted at its center of gravity at the opposite end of the link, and cooperating guiding means on the shaft and weight, said link being of such length that the pivots are spaced apart a distance greater than the sum of the radii of the pivot bearings, whereby swinging movement of all points on the weight is confined to arcs of the same length and radius, said guiding means comprising antifriction rollers rotatably mounted at the ends of the weight and curved guideways on the shaft engaging the rollers, said guideways lying radially inward of the rollers.

3. In a torsional vibration damper the combination of a rotatable shaft having a plurality of links eccentrically pivoted thereto at points spaced about its axis for independent movement in radial planes, a weight pivoted at approximately its center of gravity to the opposite end of each of said links, guiding means on the shaft, guiding means on each of said weights cooperating with the guiding means on the shaft, each of said links being of such length that its pivots are spaced apart a distance greater than the sum of the radii of its pivot bearings, whereby swinging movement of all points on the weight is confined to arcs of the same length and radius, said guiding means including rotatable antifriction rollers engaging a track substantially free from the loading action of centrifugal force.

4. In a torsional vibration damper, the combination of a shaft having a flange thereon, a weight, a pair of links each pivotally connected at its inner end to the flange and at its outer end to the weight at approximately its center of gravity, each of said links being of such length that its pivots are spaced apart a distance greater than the sum of the radii of its pivot bearings, and rollers pivotally mounted on the ends of the weight engaging cam surfaces on the flange, said cam surfaces lying radially inward of the rollers, whereby swinging movement of all points on said weight is confined to arcs of the same length and radius.

JOHN G. WILLIAMS.